United States Patent [19]
Stone

[11] 3,977,244
[45] Aug. 31, 1976

[54] INFRARED TECHNIQUE FOR AERODYNAMIC FLOW VISUALIZATION

[76] Inventor: Michael B. Stone, 3257 Victor Circle, Annandale, Va. 22003

[22] Filed: June 4, 1974

[21] Appl. No.: 476,166

[52] U.S. Cl. .......................... 73/147; 178/DIG. 1; 178/DIG. 8; 250/330
[51] Int. Cl.² .......................................... G01M 9/00
[58] Field of Search ............... 250/330, 338, 333; 73/147; 178/DIG. 1, DIG. 8

[56] References Cited
UNITED STATES PATENTS

| | | |
|---|---|---|
| 2,152,317 | 3/1939 | Kraner ................................ 73/147 |
| 2,362,235 | 11/1944 | Barnes ................................ 73/147 |
| 2,434,029 | 1/1948 | Williams ............................. 73/147 |
| 3,325,777 | 6/1967 | Fyler .................................. 250/333 |
| 3,566,669 | 3/1971 | Lawrence et al. ................... 250/330 |
| 3,869,909 | 3/1975 | Hale et al. .......................... 73/147 |

*Primary Examiner*—Richard E. Aegerter
*Assistant Examiner*—John W. Shepperd
*Attorney, Agent, or Firm*—R. S. Sciascia; Q. E. Hodges

[57] ABSTRACT

A method and apparatus for fluid flow visualization of the fluid stream about a model in a fluid circulating facility. An infrared camera is directed at a model through a window in the facility and due to the temperature differential between the model and the fluid, displays the freestream around the model.

3 Claims, 2 Drawing Figures

INFRARED TECHNIQUE FOR AERODYNAMIC FLOW VISUALIZATION

The invention described herein may be manufactured and used by or for the Government of the United States of America for governmental purposes without the payment of any royalties thereon or therefor.

BACKGROUND OF THE INVENTION

Some of the existing methods used for flow visualization are oil flow, smoke, Schlieren, tufts, and neutrally buoyant helium bubbles. Each of these methods creates special problems. Oil is difficult to apply to the model in a continuous tunnel due to the velocity. It is messy and interpretation of the flow pattern is a vague art. The application of oil, to some extent, changes the geometry and, therefore, the performance of the model. Smoke disperses too rapidly at high tunnel velocities making it difficult to see the flow patterns, and the tunnel soon becomes saturated and must be vented. Smoke often contaminates by condensing on the model and tunnel surfaces and is difficult to remove. The smoke generator nozzle also produces some interference to the air flow upstream of the model. Schlieren, in general, only shows large temperature or pressure gradients and is complicated due to the necessary critical optical alignments. Tufts can only show direction of flow on a surface. Neutrally buoyant helium bubbles show streamlines but contaminate model and tunnel surfaces.

SUMMARY OF THE INVENTION

The present invention provides a simple solution to the problem of fluid flow visualization by the use of thermographic equipment. The technique of infrared photography of the instant invention causes no interference to the flow field, does not contaminate, and operates at any tunnel velocity. All equipment is set up outside the tunnel for ease of operation and the visual display can be photographed or videotaped for a permanent record or replay.

OBJECTS OF THE INVENTION

It is the object of this invention to provide a novel technique for fluid flow visualization wherein the actual fluid streamlines around an object are displayed.

It is another object of the present invention to provide a technique of fluid flow visualization which does not contaminate or change the geometry or performance of the model.

Other objects, advantages, and novel features of the invention will become apparent from the following detailed description of the invention when considered in conjunction with the accompanying drawings wherein:

DESCRIPTION OF THE PREFERRED EMBODIMENT

The present invention is based on the fact that all objects in nature radiate infrared energy and applicant's discovery that the radiation emitted from a wind tunnel airfoil model, freestream airflow, and coanda jet issuing from the trailing edge of the model can be detected and displayed visibly using Thermography.

IR, infrared radiation, is a form of electromagnetic energy with certain characteristics identical to those of light and RF waves. Among these characteristics are reflection, refraction, absorption and speed of transmission. Infrared waves differ from light, RF, and other electromagnetic waves only in the wave length and frequency of oscillation. All objects above absolute zero emit infrared radiation. Thermography is the translation of infrared electromagnetic radiation into the visible. Commercially available infrared cameras collect this self-emitted radiation and convert the infrared radiation into an electrical signal, and display the signal on a cathode ray tube for a TV-like picture. Detection of infrared energy depends upon the contrast between the infrared radiation emitted from the source under consideration and the radiation emitted by the background. A cold object with a warm background has just as good target definition as a warm object with a cold background. Some attenuation of radiation takes place due to absorption by carbon dioxide and water vapor in the atmosphere. As a result, targets near room temperature radiate most strongly in the 8–14 micron range.

Figure 1:
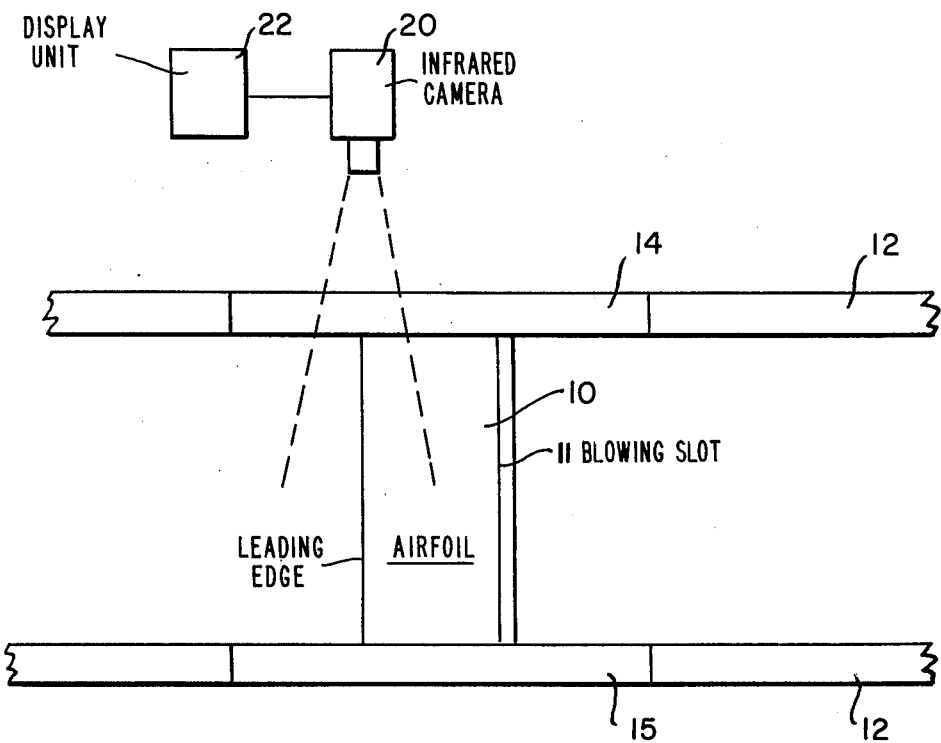
FIG. 1 is a top view of a test tunnel section showing an IR camera and display means located outside the test tunnel wall.

State of the art cameras can resolve temperature differentials of 0.5°F at 86°F, such as the commercially available Dynarad model 201 which may be equipped with a mercury cadmium telluride detector for operation in the 8–14 micron region. According to the present invention such a camera is utilized to visibly display the freestream streamline and coanda jet streamline which is created during wind tunnel testing of circulation control airfoils. In FIG. 1 circulation control airfoil 10 including blowing slot 11 is mounted by known means on windows 14 and 15 in the tunnel walls 12. IR camera 20 is shown as being directed at the leading edge of the circulation control airfoil and as being focused at the longitudinal center line of the model. The camera 20 could of course be positioned so that it views the entire model and could be focused at any longitudinal point on the model. Display unit 22 receives the electrical output signal from IR camera 20 and provides a TV-like picture.

Figure 2:
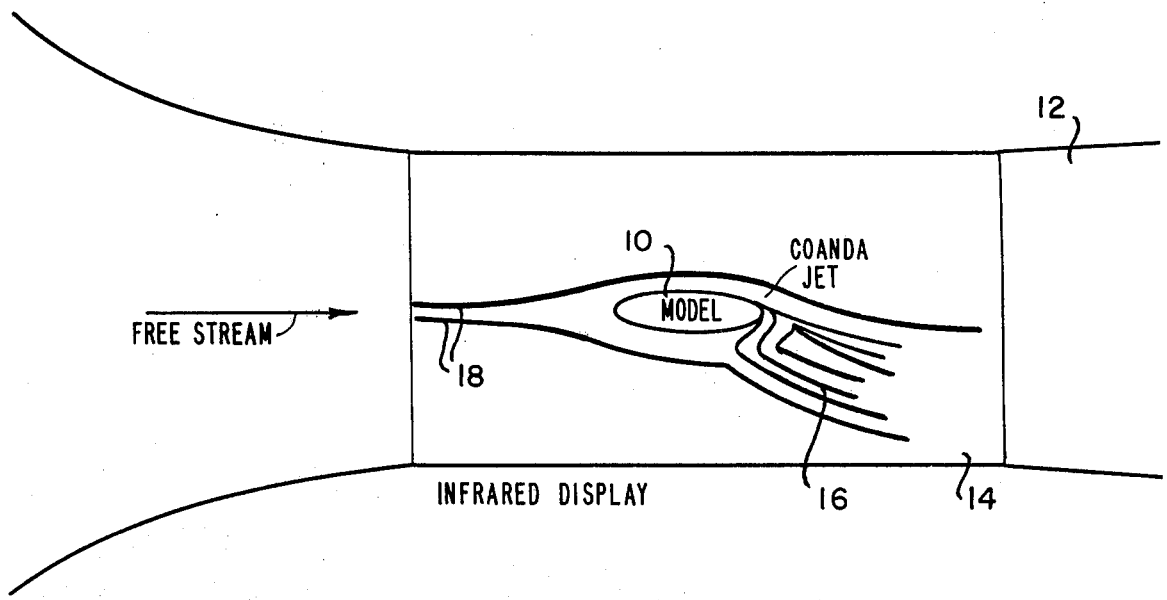
FIG. 2 is a side view pictorial representation of the fluid streamlines that will appear on the IR display for an eliptical airfoil with an attached coanda jet.

Because there is a considerable temperature differential between model, freestream, and the coanda jet (in typical tunnel conditions the coanda jet is at 58°F, the model is at 72°F and the freestream is at 92°F), the display means 22 of FIG. 1 provides a visible picture which is illustrated pictorially in FIG. 2. As seen in FIG. 2, freestream streamline 18 separates at the leading edge of the model 10 and causes detachment of the coanda jet 16 at the under surface of the model. By the present technique the model could be tested under various conditions of dynamic pressure of air on the model, at various jet velocities and angles of attack and in any speed regime. The present invention would also provide a display of when the jet impinges on the tunnel floor, wall turbulence, and trailing vortices. The boundary layer transition point and its movement with changing jet velocities and angles of attack and stall development is also visible with the present technique.

Since ordinary glass or ordinary lucite is to some degree opaque to infrared, windows 14 and 15 may consist of optical quality glass or optical quality lucite. Although it is desirable to provide a window on each side of the tunnel wall such as windows 14 and 15 illustrated in FIG. 1 so that the camera may be positioned on either side of the tunnel, the window on the tunnel wall opposite the camera 20 may be painted in order to increase target definition.

Although the present invention has been illustrated and described as relating to wind tunnel testing of airfoil sections, it is within the contemplation of this invention that the infrared technique of fluid flow visualization could be used to display the fluid streamlines around any object as long as a temperature differential between the fluid and the object can be established. Better target definition may be provided by heating the freestream fluid or the model or by any other means suitable for producing a larger temperature differential.

Obviously, many modifications and variations of the present invention are possible in the light of the above teachings. It is, therefore, to be understood that within the scope of the appended claims the invention may be practiced otherwise than as specifically described.

What is claimed is:

1. A method of visualizing the fluid stream around an object mounted in a fluid circulating facility comprising the steps of:
    placing an object within a fluid circulating facility;
    circulating a fluid within the facility and around said object;
    establishing a temperature difference between said fluid and said object;
    detecting the infrared radiation from the fluid and the object with an infrared camera; and
    displaying the detected infrared radiation pattern of the fluid stream around the object.

2. A method of visualizing the fluid stream around a body in a fluid circulating facility, comprising:
    circulating a fluid in the facility around a body;
    establishing a difference in temperature between the fluid and the body;
    detecting the infrared radiation indicative of the temperature difference between the fluid and the body;
    displaying the pattern of the detected infrared radiation for visual observation.

3. A method of visualizing fluid flow around an object comprising the steps of:
    mounting an object in a fluid circulating facility;
    circulating a fluid in said facility and about the object;
    establishing a temperature differential between the object and the fluid;
    detecting the infrared radiation of the fluid flow about the object;
    displaying the infrared pattern for visual observation.

* * * * *